United States Patent
Kawamura et al.

(10) Patent No.: US 12,085,128 B2
(45) Date of Patent: Sep. 10, 2024

(54) AXLE BEARING, GREASE COMPOSITION AND ROLLING BALL BEARING

(71) Applicant: NTN CORPORATION, Osaka (JP)

(72) Inventors: Takayuki Kawamura, Mie (JP); Ryouta Kondou, Mie (JP); Makoto Seki, Shizuoka (JP); Susumu Yamaji, Shizuoka (JP)

(73) Assignee: NTN CORPORATION, Osaka (JP)

(*) Notice: Subject to any disclaimer, the term of this patent is extended or adjusted under 35 U.S.C. 154(b) by 0 days.

(21) Appl. No.: 17/767,891

(22) PCT Filed: Oct. 8, 2020

(86) PCT No.: PCT/JP2020/038085
§ 371 (c)(1),
(2) Date: Apr. 9, 2022

(87) PCT Pub. No.: WO2021/070888
PCT Pub. Date: Apr. 15, 2021

(65) Prior Publication Data
US 2024/0084853 A1 Mar. 14, 2024

(30) Foreign Application Priority Data

Oct. 10, 2019 (JP) .................. 2019-187011
Oct. 10, 2019 (JP) .................. 2019-187033

(51) Int. Cl.
*F16C 19/18* (2006.01)
*C10M 107/02* (2006.01)
(Continued)

(52) U.S. Cl.
CPC ....... *F16C 33/6633* (2013.01); *C10M 107/02* (2013.01); *C10M 115/08* (2013.01);
(Continued)

(58) Field of Classification Search
CPC ............... F16C 19/183; F16C 33/6603; F16C 33/6633; F16C 2326/02; C10M 107/02;
(Continued)

(56) References Cited

U.S. PATENT DOCUMENTS 5,783,531 A * 7/1998 Andrew ............... C10M 117/06
508/519
2010/0087349 A1* 4/2010 Lee ...................... C10M 111/04
508/499
(Continued)

FOREIGN PATENT DOCUMENTS

CN 104822955 A 8/2015
DE 102018100358 A1 * 8/2018 .......... C10M 169/00
(Continued)

OTHER PUBLICATIONS

Machine Translation of JP2011178824 A dated Sep. 15, 2011.
(Continued)

*Primary Examiner* — Phillip A Johnson
(74) *Attorney, Agent, or Firm* — Hedman & Costigan, P.C.; James V. Costigan; Kathleen A. Costigan

(57) ABSTRACT

To provide an axle bearing having a low torque property and superior bearing lifetime. A hub bearing 6 is configured to rotatably support a wheel of a vehicle, and has a grease composition 10 sealed in an inner space thereof. The grease composition 10 contains a base oil and a thickener. The shear stress of the grease composition at the shear rate of 1,000-10,000 $s^{-1}$ at 25° C. is 3,000 Pa or less. The viscosity of the grease composition is 1 Pas or less. The yield stress of the grease composition at 25° C. measured by a dynamic viscoelasticity analysis method using a rheometer is 1,300-3,000 Pa.

12 Claims, 5 Drawing Sheets

(51) Int. Cl.
  *C10M 115/08* (2006.01)
  *C10M 169/00* (2006.01)
  *C10M 169/02* (2006.01)
  *C10M 169/04* (2006.01)
  *F16C 33/66* (2006.01)
  *C10N 20/02* (2006.01)

(52) U.S. Cl.
  CPC ........ *C10M 169/02* (2013.01); *C10M 169/04* (2013.01); *F16C 19/183* (2013.01); *F16C 33/6603* (2013.01); *C10N 2020/02* (2013.01); *F16C 2326/02* (2013.01)

(58) Field of Classification Search
  CPC .............. C10M 107/04; C10M 107/06; C10M 107/08; C10M 107/10; C10M 107/12; C10M 107/14; C10M 107/16; C10M 107/18; C10M 115/08; C10M 169/02; C10M 169/04; C10M 169/041; C10M 169/042; C10M 169/044; C10M 169/045; C10M 169/047; C10M 169/048; C10N 2020/02
  See application file for complete search history.

(56) References Cited

U.S. PATENT DOCUMENTS

| | | | | |
|---|---|---|---|---|
| 2010/0323937 | A1* | 12/2010 | Wu | C10M 107/06 |
| | | | | 508/591 |
| 2014/0226927 | A1* | 8/2014 | Ishii | F16C 13/02 |
| | | | | 384/291 |
| 2015/0232782 | A1* | 8/2015 | Fisher | C10M 169/042 |
| | | | | 508/208 |
| 2016/0201726 | A1* | 7/2016 | Watabe | C10M 117/04 |
| | | | | 384/462 |
| 2017/0074326 | A1* | 3/2017 | Sato | C10M 133/04 |
| 2018/0298304 | A1* | 10/2018 | Yoshizaki | F16C 33/6633 |
| 2019/0107154 | A1* | 4/2019 | Ishida | F16C 33/7883 |

FOREIGN PATENT DOCUMENTS

| | | | | |
|---|---|---|---|---|
| EP | 2930385 | A1 | 10/2015 | |
| EP | 1688476 | B1 * | 7/2019 | ........... C10M 111/04 |
| ES | 2669556 | T3 * | 5/2018 | ........... C10M 169/02 |
| JP | 2009209953 | A * | 9/2009 | |
| JP | 2011178824 | A | 9/2011 | |
| JP | 2013023644 | A | 2/2013 | |
| JP | 2017172714 | A | 9/2017 | |
| JP | 2018059586 | A | 4/2018 | |
| JP | 6917593 | B2 * | 8/2021 | ........... C10M 119/20 |
| WO | WO-2012057181 | A1 * | 5/2012 | ........... B23Q 11/1061 |
| WO | 2014088006 | A1 | 12/2014 | |
| WO | WO-2015137440 | A1 * | 9/2015 | ........... C10M 101/02 |
| WO | WO-2018030090 | A1 * | 2/2018 | ........... C10M 101/02 |
| WO | WO-2019131437 | A1 * | 7/2019 | ........... C10M 169/02 |

OTHER PUBLICATIONS

Machine Translation of JP2013023644 A dated Feb. 4, 2013.
Machine Translation of JP2018059586 A dated Apr. 12, 2018.
Machine Translation of JP2017172714 A dated Sep. 28, 2017.
Machine Translation of abstract of CN104822955 A dated Aug. 5, 2015.

* cited by examiner

[ churning ]  [ channeling ]

US 12,085,128 B2

AXLE BEARING, GREASE COMPOSITION AND ROLLING BALL BEARING

TECHNICAL FIELD

The present invention relates to an axle bearing, in particular a hub bearing for vehicles. Further, the present invention relates to a grease composition and a rolling ball bearing with the grease composition sealed therein.

BACKGROUND ART

An axle bearing is configured to rotatably support a wheel of a vehicle or an axle connected to the wheel. Examples of the axle bearing include a hub bearing for vehicles and a railway vehicle axle bearing. For example, the hub bearing is integrated, as a unit, with a hub wheel or a housing which is a peripheral component of the bearing, and thus the number of components is reduced and the light weight thereof is realized. A grease composition for lubrication is sealed in the axle bearing in order to reduce rolling friction and sliding friction. The grease lubrication has been widely used because a long lifetime can be realized and an external lubrication unit or the like is not needed, which results in low cost.

For example, as conventional grease for hub bearings, a grease composition has been proposed in which mineral oil or synthetic oil is used as a base oil, a mixture of an aliphatic diurea compound, an aliphatic alicyclic diurea compound and an alicyclic diurea compound is used as a thickener, and further MoDTC or calcium sulfonate is added (see Patent Document 1). By using this grease composition, flaking of the bearing member due to metal fatigue is prevented to extend the bearing lifetime.

Further, a grease composition for lubrication is also sealed in a rolling ball bearing in order to reduce rolling friction and sliding friction. The rolling ball bearing into which the grease composition is sealed has been usually used in vehicles and industrial equipment because a long lifetime can be realized and an external lubrication unit or the like is not needed, which results in low cost.

The bearing torque (rotational torque) of the rolling ball bearing is an important property of the product and a low torque property is required in a viewpoint of low energy consumption and resource saving. Behaviors of channeling and churning of the grease affect the rotational torque of the rolling ball bearing. In the channeling, during the rotating of the bearing, the grease is pushed aside and less amount of the grease adheres to the surface of the rolling element and the raceway surface, and thus the torque is apt to be low. On the other hand, in the churning, the grease that is pushed aside is returned to the raceway surface due to the rotation of the bearing, so that a large amount of the grease normally adheres to the surface of the rolling element and the raceway surface and thus the torque is apt to be high. Accordingly, development of the grease is required that causes the churning as the behavior of the grease.

For example, Patent Document 2 discloses a grease composition that contains a base oil and a thickener. The thickener is lithium 12-hydroxystearate. A mass ratio of the thickener to the whole of the grease composition is 15% or less. The yield stress of the grease composition is 2 kPa or more. According to Patent Document 2, the property of the channeling is enhanced by increasing the yield stress so that a low torque property is realized.

PRIOR ART DOCUMENTS

Patent Documents

Patent Document 1: JP 2011-178824 A
Patent Document 2: JP 2013-023644 A

SUMMARY OF THE INVENTION

Problems to be Solved by the Invention

In recent years, reduction of the rotational torque in an axle bearing such as a hub bearing is required along with the increase of the demand of low energy consumption and resource saving. As described above, the rotational torque is affected by the behaviors of the channeling and the churning of the grease. In Patent Document 1, the rotational torque in operating is not evaluated, so that the composition of the grease focusing on the behavior of the grease is not considered.

Further, in recent years, the use environment of the rolling ball bearing has become severe more and more, and the rolling ball bearing is required that has a low torque property, and superior bearing lifetime under a high load condition and a high temperature condition. In Patent Document 2, the rotational torque is evaluated, however the bearing lifetime of is not considered. Accordingly, there is still room for improvement on long term use.

An object of the present invention (the first invention) is, in order to solve such problems, to provide an axle bearing that has a low torque property and superior bearing lifetime. Further, another object of the present invention (the second invention) is, in order to solve such problems, to provide a grease composition that contributes a low torque property and superior bearing lifetime, and a rolling ball bearing with the grease composition sealed therein.

Means for Solving the Problems

An axle bearing of the first invention according to the present disclosure is configured to rotatably support a wheel of a vehicle or an axle connected to the wheel. The axle bearing includes a grease composition sealed in an inner space of the axle bearing. The grease composition contains a base oil and a thickener. The shear stress of the grease composition at the shear rate of 1,000-10,000 $s^{-1}$ at 25° C. is 3,000 Pa or less. The viscosity of the grease composition is 1 Pas or less. The yield stress of the grease composition at 25° C. measured by a dynamic viscoelasticity analysis method using a rheometer is 1,300-3,000 Pa.

The thickener may be a diurea compound obtained by causing a diisocyanate component and a monoamine component to react with each other, and the monoamine component may include aliphatic monoamine and alicyclic monoamine.

The alicyclic monoamine may contain dicyclohexylamine.

The base oil may contain synthetic hydrocarbon oil as a main component, and the dynamic viscosity of the base oil at 40° C. may be 30-80 $mm^2/s$.

The axle bearing may be configured as a hub bearing that rotatably supports a wheel of a vehicle. The hub bearing may include: an outer member having double-row outer raceway surfaces on an inner periphery; an inner member having double-row inner raceway surfaces on an outer periphery, the double-row inner raceway surfaces respectively facing the double-row outer raceway surfaces; double-row rolling elements housed between the inner raceway surfaces and the outer raceway surfaces; and the grease composition sealed around the rolling elements. The inner member may include a hub wheel and an inner ring. The hub wheel may have: a wheel mount flange integrally formed on one end portion of the hub wheel; one of the inner raceway surfaces that faces one of the double-row outer raceway surfaces and that is formed on an outer periphery of the hub wheel; and a small diametrical stepped portion that extends from the inner raceway surface in an axial direction. The inner ring may have the other one of the inner raceway surfaces that faces the other one of the double-row outer raceway surfaces and that is formed on an outer periphery of the inner ring. The inner ring may be press-fitted onto the small diametrical stepped portion of the hub wheel and may be fixed to the hub wheel using a swaging portion that is formed by plastically deforming an end portion of the small diametrical stepped portion toward a radially outer side.

The axle bearing may be configured to be used in a rotation speed range of 1,000 $min^{-1}$ or less.

A grease composition of the second invention according to the present disclosure contains a base oil and a thickener. The shear stress of the grease composition at the shear rate of 20,000 $s^{-1}$ at 25° C. is 0.2 Pa or less, and the yield stress of the grease composition at 25° C. measured by a dynamic viscoelasticity analysis method using a rheometer is 1,600 Pa or more.

The thickener may be a diurea compound obtained by causing a diisocyanate component and a monoamine component to react with each other, and the monoamine component may include aliphatic monoamine and alicyclic monoamine.

The alicyclic monoamine may contain dicyclohexylamine.

The base oil may contain synthetic hydrocarbon oil as a main component, and the dynamic viscosity of the base oil at 40° C. may be 30-80 $mm^2/s$.

A rolling ball bearing of the second invention according to the present disclosure includes an inner ring, an outer ring, a ball interposed between the inner ring and the outer ring, a resin cage that retains the ball, and a grease composition sealed around the ball. The grease composition is the grease composition of the second invention according to the present disclosure.

The rolling ball bearing may be configured to be used in a rotation speed range of 2,000 $min^{-1}$ or less.

Effect of the Invention

The axle bearing of the first invention of the present disclosure includes the grease composition sealed in the inner space of the axle bearing. Further, the shear stress of the grease composition at the shear rate of 1,000-10,000 $s^{-1}$ at 25° C. is 3,000 Pa or less, the viscosity of the grease composition is 1 Pas or less, and the yield stress of the grease composition is 1,300-3,000 Pa. Accordingly, the grease is low in viscosity in a low rotation speed range, and a channeling property of the grease is enhanced. Consequently, the grease composition can contribute low rotational torque of the axle bearing and superior bearing lifetime.

The grease composition of the second invention according to the present disclosure contains the base oil and the thickener. The shear stress of the grease composition at the shear rate of 20,000 $s^{-1}$ at 25° C. is 0.2 Pa or less, and the yield stress of the grease composition is 1,600 Pa or more. Accordingly, the grease is low in viscosity in a specified shear rate range, and the channeling property of the grease is enhanced. Consequently, the grease composition can contribute low rotational torque and superior bearing lifetime.

The rolling ball bearing of the second invention according to the present disclosure includes the inner ring, the outer ring, the ball interposed between the inner ring and the outer ring, the resin cage that retains the ball, and the grease composition of the second invention according to the present disclosure sealed around the ball. Further, the rolling ball bearing is configured to be used in a rotation speed range of 2,000 $min^{-1}$ or less. Accordingly, the grease is low in viscosity in particular in an actual use rotation speed range and thus contributes low rotational torque. Further, superior bearing lifetime under a high load condition and a high temperature condition can be realized.

MODE FOR CARRYING OUT THE INVENTION

In grease lubrication for an axle bearing, in order to realize a low torque property, it is important to reduce shear resistance of grease interposed between a rolling element and a surface of a cage pocket. The present inventors conducted a study in order to reduce the shear resistance while focusing on grease viscosity (viscous property) and a channeling property of a grease composition. As a result of the study, the present inventors found that the axle bearing shows a low torque property and a long lifetime by setting the shear stress and the viscosity at a specified shear rate, and the yield stress of the grease composition in specified ranges. The first invention according to the present disclosure is derived from such knowledge.

Figure 1:
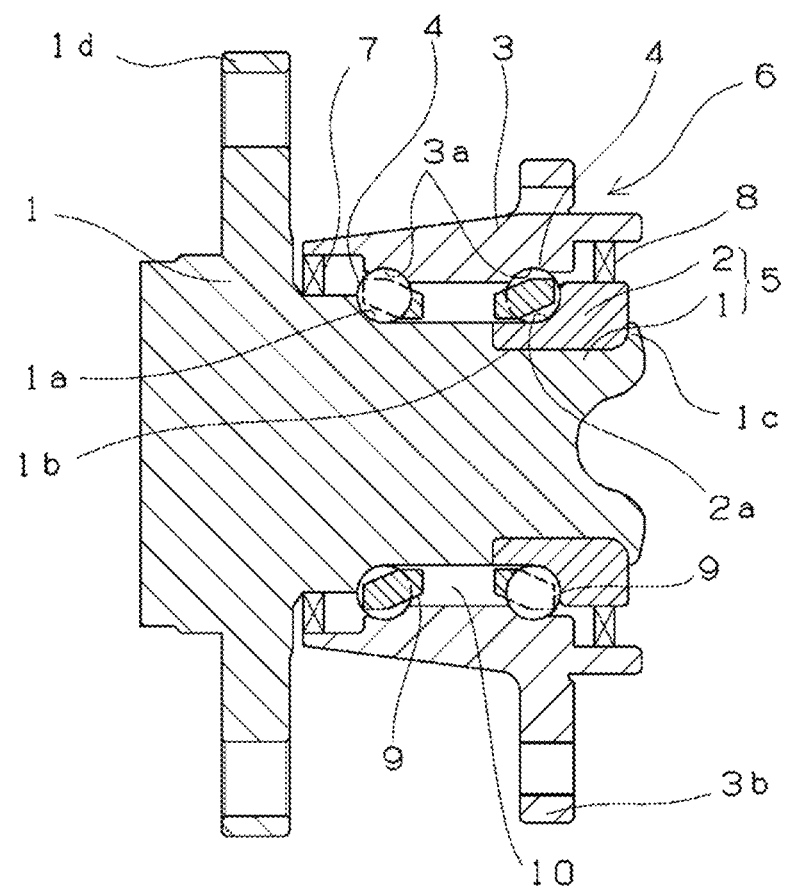
FIG. 1 is a sectional view showing a hub bearing as an example of an axle bearing of the first invention according to the present disclosure.

An example of the axle bearing of the first invention according to the present disclosure is described with reference to FIG. 1. FIG. 1 is a sectional view of a driving wheel third-generation hub bearing. As shown in FIG. 1, a hub bearing 6 includes an inner member 5 having a hub wheel 1 and an inner wheel 2, an outer member 3 as an outer wheel, and double-row rolling elements 4, 4. The hub wheel 1 has a wheel mount flange 1d for mounting a wheel (not shown) thereto. The wheel mount flange 1d is integrally formed on one end portion of the hub wheel 1. Further, the hub wheel 1 has an inner raceway surface 1a that is formed on an outer periphery, and a small diametrical stepped portion 1b that extends in an axial direction from the inner raceway surface 1a. In the present disclosure, an "outer side" in the axial direction denotes a width-direction outer side in a state in which the hub bearing 6 is mounted to a vehicle, and an "inner side" in the axial direction denotes a width-direction central side. The small diametrical stepped portion 1b is located at the inner side in the axial direction, relative to the inner raceway surface 1a.

An inner ring 2 that has an inner raceway surface 2a on an outer periphery is press-fitted onto the small diametrical stepped portion 1b of the hub wheel 1. The inner ring 2 is prevented from dropping off from the hub wheel 1 in the axial direction by a swaging portion 1c formed by plastically deforming an end portion of the small diametrical stepped portion 1b of the hub wheel 1 toward a radially outer side. The outer member 3 has a vehicle body mount flange 3b integrally formed on an outer periphery, and outer raceway surfaces 3a, 3a formed on an inner periphery. The double-row rolling elements 4, 4 are rollably housed between the double-row outer raceway surfaces 3a, 3a and the inner raceway surfaces 1a, 2a facing to the outer raceway surfaces 3a, 3a. The double-row rolling elements 4, 4 are retained by ring-like cages 9, 9. The rolling elements 4 in each row are housed in pockets that are formed in each cage 9 and are separately formed in a circumferential direction.

Examples of material used in the hub bearing (hub wheel or the like) include bearing steel, carburized steel, and carbon steel for mechanical structure. Of these materials, the carbon steel for mechanical structure such as S53C that is superior in forging property and low in cost is preferably employed. The carbon steel is generally used after rolling fatigue strength of a bearing part is secured by applying an induction heat treatment thereto.

A grease composition 10 is sealed in a space surrounded by a seal member 7, the outer member 3, a seal member 8, the inner ring 2, and the hub wheel 1. The grease composition 10 coats the double-row rolling elements 4, 4 interposed between the outer member 3 and the inner member 5 in order for lubrication of rolling contact between rolling surfaces of the rolling elements 4, 4 and the inner raceway surfaces 1a, 2a and between the rolling surfaces of the rolling elements 4, 4 and the outer raceway surfaces 3a, 3a. In a state in which the grease composition 10 enters pocket gaps between the cages 9, 9 and the rolling elements 4, 4 within the hub bearing 6 (churning state), the hub bearing 6 is easily affected by shear resistance of the grease composition 10.

The grease composition of the first invention according to the present disclosure contains a base oil and a thickener, and further various additives are added as needed thereto. The grease composition has a characteristic that the shear stress at the shear rate of 1,000-10,000 $s^{-1}$ at 25° C. is 3,000 Pa or less, the viscosity is 1 Pas or less, and the yield stress at 25° C. measured by a dynamic viscoelasticity analysis method using a rheometer is 1,300-3,000 Pa.

The yield stress of the grease composition is measured by a dynamic viscoelasticity analysis method defined in JIS K 7244, using a rheometer. Specifically, the storage modulus G' that indicates an elastic component of the grease and the loss modulus G" that indicates a viscous component are measured by changing a swing angle using the rheometer under a specified condition, and then the yield stress is defined by the shear stress when the ratio thereof (tan δ=G"/G') is 1. The storage modulus G' is equivalent to the energy which can be elastically stored, among the external force applied to the grease composition. The loss modulus G" is equivalent to the energy dissipated as heat, among the external force applied to the grease composition.

The condition in the dynamic viscoelasticity analysis is preferably the frequency of 1 Hz and the temperature of 25° C. Further, it is preferable to use a rheometer having a parallel plate type cell. This rheometer is capable of applying constant stress and thus suitable to measuring of the yield stress of the grease composition.

Figure 2:
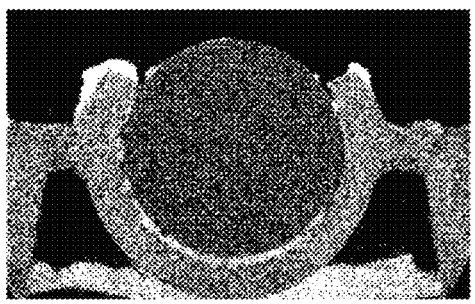
FIG. 2 is a view showing a state of grease in a cage pocket.
Figure 2:
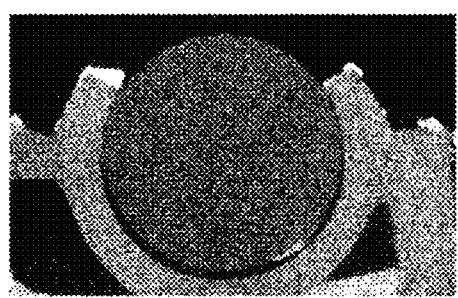

Here, FIG. 2 shows photographs of an adhering state of the grease in a reference bearing photographed by an X-ray CT scanner. In an example shown in FIG. 2, an inner ring, an outer ring, rolling elements, cages, and seal are formed of resin so as to allow the X-ray to permeate therethrough. Further, in order to easily make contrast between the grease and the components, 5mass % of tungsten is added as a tracer to the grease. The bearings were operated while measuring the torque thereof, and then the bearing with churning (the torque of 13 Nmm) that was stopped at an early state (5 hours) and the bearing with channeling (the torque of 5 Nmm) that was stopped after operated for a long time (23 hours) were observed. As shown in FIG. 2, there is a large difference relating to the grease amount in a pocket gap between the cage and the rolling element, between a case that the channeling occurs and a case that the churning occurs. That is, there is no grease in the pocket gap in the case of channeling, while there is some grease in the pocket gap in the case of churning and thus the grease causes the shear resistance.

The grease composition employed in the first invention according to the present disclosure has the yield stress at 25° C. of 1, 300 Pa or more, and thus the grease composition is pushed aside while the bearing is rotating, and the grease composition, which is pushed from the raceway surface, is positioned to be hardly introduced onto the raceway surface. For example, in the inner ring rotating hub bearing as shown in FIG. 1, the grease composition is moved from the inner raceway surface to an outer ring inner diametrical surface by the centrifugal force and then stored there as a lump of grease. As a result, the channeling state that decreases the adhering amount of the grease to the surface of the rolling element and the raceway surface is caused, so that the rotational torque is reduced. The stored grease composition or the separated oil thereof is returned to the raceway surface so as to lubricate the bearing.

In the first invention according to the present disclosure, it is preferable that the yield stress of the grease composition is 1,700 Pa or more. As the yield stress is larger, the grease composition is prevented from moving toward the raceway surface due to vibration or temperature increasing as driving force, so that a stable channeling state is easily maintained. Further, the bearing lifetime can be prevented to be shortened due to heat generation along with the increase of the rotational torque. The upper limit of the yield stress of the grease composition is 3,000 Pa. In a case in which the yield stress is high, a lubrication component is hardly supplied, so that the bearing lifetime might be shortened. It is preferable that the yield stress of the grease composition is 1,700-2,500 Pa.

Figure 3:
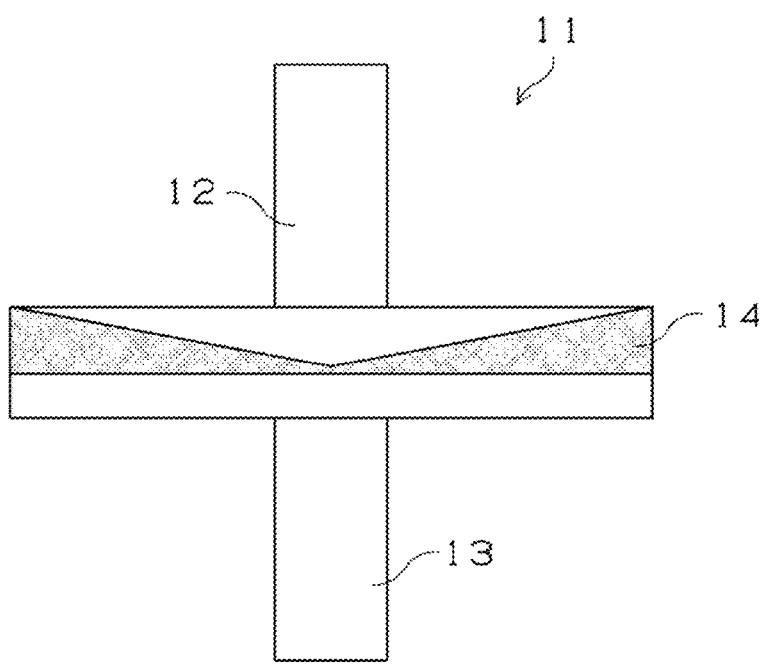
FIG. 3 is a schematic view showing an example of a rheometer.

The shear stress of the grease composition is calculated using a rheometer. It is preferable to use a rheometer having a cone plate type cell. The outline of the rheometer is shown in FIG. 3. As shown in FIG. 3, a rheometer 11 includes a cone plate type cell 12 and a horizontal disc plate 13. The cell 12 and the plate 13 are arranged to be in contact with each other at one point (with a slight gap). Grease 14 to be measured is disposed between the cell 12 and the plate 13. In this rheometer, the shear rate applied to the grease 14 is constant at any position regardless of the distance from the center of the cell.

Examples of a condition of the rheology measurement include (1) rotation speed dependence under constant temperature and single direction rotation, (2) frequency dependence under constant temperature and constant shear strain, and (3) shear stress dependence of dynamic viscoelasticity under constant frequency. For example, in the condition (1), the rheometer is rotated for a specified time at the constant temperature in one rotational direction, and the value of the shear stress when the shear stress becomes constant is employed.

Further, the viscosity of the grease composition, and the shear stress at the shear rate beyond the measuring range of the rheometer are calculated (expected) using Herschel-Bulkley's equation (Herschel-Bulkley's equation) which is a general flow equation of non-Newtonian fluid. The Herschel-Bulkley's equation is represented by the following equation.

$$\eta = \frac{\tau_y}{\gamma} + \kappa \gamma^{n-1} \qquad \text{Equation 1}$$

η: viscosity (Pa·S)
$\tau_y$: yield stress (Pa)
γ: shear rate (1/S)
K, n: constant The shear rate is applied to the grease in the pocket gap between the rolling element and the cage and is calculated from a bearing rotation speed to be set. For example, as the rolling element is located at the center of the pocket of the cage, in a case in which an inner ring of the ball bearing (6204) is rotated at a speed of 1,800-10,000 $\min^{-1}$, the shear rate of the grease in the pocket is 24,000-130,000 $s^{-1}$. Further, the yield stress and each constant are determined based on the evaluation of the rheological property of the grease using a rheometer. Using the above-described equation, the viscosity of the grease composition at the specified shear rate is calculated. The viscosity at the shear rate beyond the measuring range may be extrapolated from the calculated viscosity. The shear stress at the shear rate is calculated by multiplying the obtained viscosity and the shear rate.

In the grease composition of the first invention according to the present disclosure, it is preferable that the shear stress at the shear rate of 1,000-10,000 $s^{-1}$ at 25° C. is 2,500 Pa or less and the viscosity is 0.8 Pas or less. It is more preferable that the shear stress is 2,000 Pa or less and the viscosity is 0.6 Pas or less. The lower limit of the shear stress is, for example, 1,000 Pa and the lower limit of the viscosity is, for example, 0.2 Pas.

The grease composition of the first invention according to the present disclosure is not especially limited as long as the grease composition contains the base oil and the thickener, and the above-described yield stress, shear stress and viscosity are within the specified ranges. The base oil is not especially limited, and therefore a general base oil normally used in a field of grease may be employed. Examples of the base oil include highly refined oil, mineral oil, ester oil, ether oil, synthetic hydrocarbon oil (PAO oil), silicone oil, fluorine oil, and mixed oil of any of these oils. Of these oils, the base oil that contains the PAO oil as a main component is preferable. In this case, the content of the PAO oil to the whole of the base oil (mixed oil) is 50 mass % or more, preferably 80 mass % or more. In particular, the base oil that contains only the PAO oil (100% PAO oil) is preferable.

Dynamic viscosity of the base oil (in a case of mixed oil, the dynamic viscosity of the mixed oil) at 40° C. is, for example, 30-100 $mm^2/s$, preferably 30-80 $mm^2/s$. Lower dynamic viscosity of the base oil is preferable from a viewpoint of realizing the low torque property, however in such a case, the bearing lifetime might be shortened. Thus, by setting the dynamic viscosity of the base oil to 30-80 $mm^2/s$, both of the low torque property and the long lifetime can be further easily realized. More preferably, the dynamic viscosity of the base oil at 40° C. is 30-50 $mm^2$ The thickener of the grease composition of the first invention according to the present disclosure is not especially limited, and therefore a general thickener normally used in a field of grease may be employed. For example, soap-based thickener such as metal soap and complex metal soap, or non-soap-based thickener such as bentone, silica gel, urea compound, and urea-urethane compound may be employed. Examples of the metal soap include sodium soap, calcium soap, aluminum soap, and lithium soap. Examples of the urea compound and urea-urethane compound include diurea compound, triurea compound, tetraurea compound, other polyurea compounds, and diurethane compound. Of these urea compounds, it is preferable to employ the diurea compound having superior high temperature resistance.

The diurea compound is obtained by causing a diisocyanate component and a monoamine component to react with each other. In particular, aliphatic alicyclic diurea compound is preferable as the diurea compound. The aliphatic alicyclic diurea compound is obtained by using aliphatic monoamine and alicyclic monoamine as the monoamine component. A compound rate (for example, mol %) of each of the aliphatic monoamine and the alicyclic monoamine is not especially limited, however it is preferable that the compound rate of the aliphatic monoamine is larger than that of the alicyclic monoamine. Specifically, it is preferable that the compound rate of the aliphatic monoamine is 60 mol % or more to the whole of the monoamine.

Examples of the diisocyanate component that forms the diurea compound include phenylene diisocyanate, tolylene diisocyanate, diphenyl diisocyanate, diphenylmethane diisocyanate (MDI), octadecane diisocyanate, decane diisocyanate, and hexane diisocyanate. Examples of the aliphatic monoamine include hexyl amine, octylamine, dodecyl amine, hexadecylamine, octadecylamine, stearylamine, and oleylamine. Examples of the alicyclic monoamine include cyclohexylamine, and dicyclohexylamine, in particular, dicyclohexylamine is preferable.

Further, alicyclic diurea compound using alicyclic monoamine, aliphatic diurea compound using aliphatic monoamine, or aromatic diurea compound using aromatic monoamine (p-toluidine or the like) may be employed as the diurea compound.

The base grease is produced by compounding the thickener into the base oil. The base grease containing the diurea compound as the thickener is produced by causing the diisocyanate component and the monoamine component to react with each other in the base oil. A content of the thickener to the whole of the grease composition is, for example, 5-40 mass %, preferably 10-30 mass %, and more preferably 10-20 mass %. In a case in which the content of the thickener is less than 5mass %, a thickening effect is inferior and thus the base grease is difficult to be in a greasy condition. Further, in a case in which the content of the thickener is more than 40 mass %, the obtained base grease becomes too hard and thus a specified effect is hardly realized.

In addition, a known additive may be added as needed to the grease composition. Examples of the additive include an extreme pressure agent such as organic zinc compound and organic molybdenum compound, an antioxidant such as amine-based compound, phenol-based compound and sulfur-based compound, a friction preventive agent such as sulfur-based compound and phosphorus-based compound, an antirust agent such as polyhydric alcohol ester, a friction reduction agent such as molybdenum disulfide and graphite, and an oily agent such as ester and alcohol.

The worked penetration (JIS K 2220) of the grease composition is preferably in a range of 200-350. In a case in which the worked penetration is less than 200, a lack of lubrication might be caused because of less oil separation. In a case in which the worked penetration is more than 350, the grease composition is so soft that the grease composition is liable to undesirably leak out of the bearing.

The above-described grease composition is sealed in the axle bearing of the first invention according to the present disclosure. The grease composition has low viscosity in a range of the shear rate, which is important to in particular a hub bearing, of 1,000-10,000 s$^{-1}$, and thus, as described in the following example, the axle bearing with the grease composition shows a low torque property in a high load condition and a low rotation speed condition and has superior bearing lifetime. Accordingly, the axle bearing is especially suitable to a hub bearing. The actual use rotation speed range of the hub bearing is preferably 1,000 min$^{-1}$ or less, and more preferably 600 min$^{-1}$ or less.

Further, the axle bearing is suitable to a hub bearing, in particular to a third-generation hub bearing (GEN3) that integrates the axle (hub wheel) and the bearing inner ring and reduces the excess thickness so as to improve the assemblability in the manufacturing line. The carbon steel for mechanical structure such as S53C that is superior in forging property and low in cost is employed in the third-generation hub bearing. A raceway part of the carbon steel for mechanical structure is subjected to the induction heat treatment to secure the rolling fatigue strength of the bearing part, however the surface strength is low because of less alloy component. Thus, the resistance to the surface-starting flaking of the bearing part might be inferior, compared to a bearing part formed of the bearing steel (SUJ or the like). However, the long lifetime under a high load condition of the bearing formed of the carbon steel for mechanical structure can be realized by using the above-described grease composition.

In grease lubrication for a rolling ball bearing, in order to realize a low torque property, it is important to reduce shear resistance of grease interposed between a ball and a surface of a cage pocket. The present inventors conducted a study in order to reduce the shear resistance while focusing on grease viscosity (viscous property) and a channeling property. As a result of the study, the present inventors found that the rolling ball bearing shows a low torque property and a long lifetime by setting the shear stress at a specified shear rate, and the yield stress of the grease composition in specified ranges. The second invention according to the present disclosure is derived from such knowledge.

Figure 4:
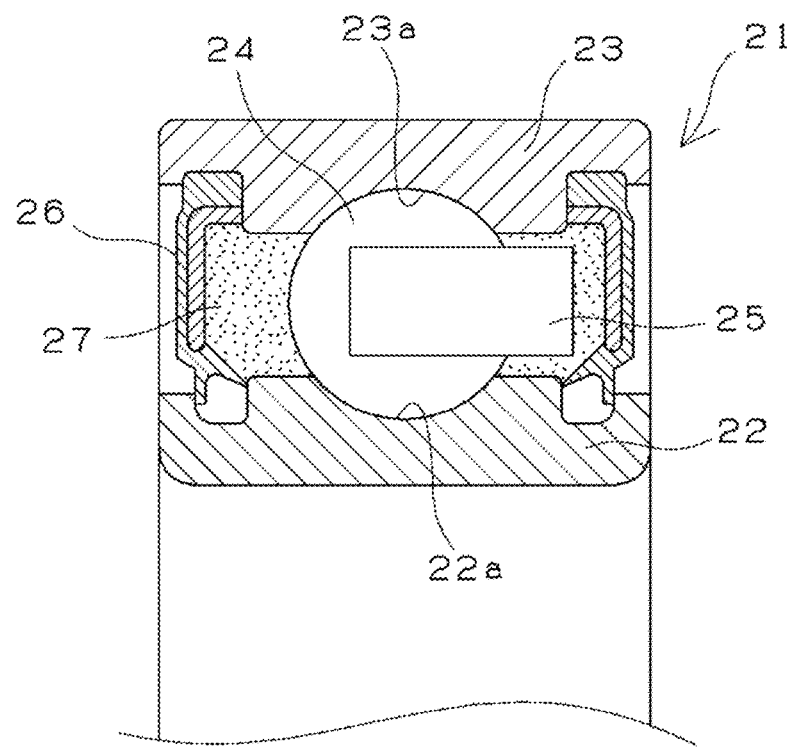
FIG. 4 is a sectional view showing an example of a rolling ball bearing of the second invention according to the present disclosure.
Figure 5:
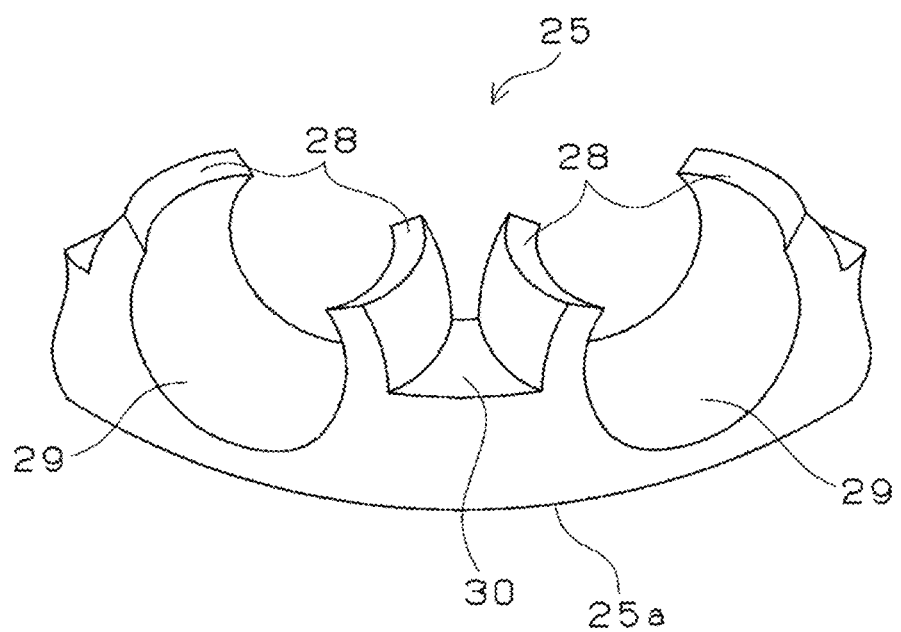
FIG. 5 is a perspective view showing a portion of a cage in FIG. 4.

An example of the rolling ball bearing of the second invention according to the present disclosure is described with reference to FIG. 4 and FIG. 5. FIG. 4 is a partial sectional view of a deep groove ball bearing into which a resin crown cage is assembled, as a rolling ball bearing of the second invention according to the present disclosure. FIG. 5 is a perspective view of a portion of the crown cage. As shown in FIG. 4, a deep groove ball bearing 21 includes an inner ring 22 having a raceway surface 22a on an outer peripheral surface, and an outer ring 23 having a raceway surface 23a on an inner peripheral surface. The inner ring 22 and the outer ring 23 are arranged coaxially to each other. A plurality of balls 24 is interposed between the raceway surface 22a of the inner ring and the raceway surface 23a of the outer ring. The balls 24 are retained by a crown cage 25. Further, the deep groove ball bearing 21 includes ring seal members 26 disposed at both end openings in an axial direction of the inner and outer rings, and a grease composition 27 sealed in a bearing inner space formed by the inner ring 22, the outer ring 23, the cage 25 and the seal members 26. The deep groove ball bearing 21 is lubricated by the grease composition 27. The grease composition 27 corresponds to the grease composition of the second invention according to the present disclosure.

As shown in FIG. 5, the crown cage 25 has pairs of retaining claws 28 that face to each other, disposed on an upper surface of a ring body 25a and aligned in a circumferential direction at the same intervals. The facing retaining claws 28 are curved to be close to each other so as to form a pocket 29 that retains the ball as a rolling element, between the retaining claws 28. A flat portion 30, which is a base surface for rising of the retaining claws 28, is formed between back sides of the retaining claws 28 adjacent to each other disposed at edges of the pockets 29. In a state in which the grease enters the pocket gaps between the retaining cage 25 and the balls within the bearing (churning state), the bearing is easily affected by shear resistance of the grease.

The grease composition of the second invention according to the present disclosure contains a base oil and a thickener, and further various additives are added as needed thereto. The grease composition has a characteristic that the shear stress at the shear rate of 20,000 s$^{-1}$ at 25° C. is 0.2 Pa or less, and the yield stress at 25° C., measured by a dynamic viscoelasticity analysis method using a rheometer is 1,600 Pa or more. The yield stress of the grease composition is measured by the above-described method under the above-described conditions.

The grease composition of the second invention according to the present disclosure has the yield stress at 25° C. of 1,600 Pa or more, and thus the grease composition is pushed aside while the bearing is rotating, and the grease composition, which is pushed from the raceway surface, is positioned to be hardly introduced onto the raceway surface. For example, in the inner ring rotating ball bearing, the grease composition is moved from the raceway surface to an outer ring inner diametrical surface by the centrifugal force and then stored there as a lump of grease. As a result, the channeling state that decreases the adhering amount of the grease to the surface of the ball and the raceway surface is caused, so that the rotational torque is reduced. The stored grease composition or the separated oil thereof is returned to the raceway surface so as to lubricate the bearing.

In the second invention according to the present disclosure, it is preferable that the yield stress of the grease composition is 1,700 Pa or more. As the yield stress is larger, the grease composition is prevented from moving toward the raceway surface due to vibration or temperature increasing as driving force, so that a stable channeling state is easily maintained. Further, the bearing lifetime can be prevented to be shortened due to heat generation along with the increase of the rotational torque. The upper limit of the yield stress of the grease composition is, for example, 5,000 Pa, preferably 3,000 Pa. In a case in which the yield stress is high, a lubrication component is hardly supplied, so that the bearing lifetime might be shortened. It is preferable that the yield stress of the grease composition is 1,700-2,500 Pa.

The shear stress of the grease composition is calculated using the rheometer having the cone plate type cell (see FIG. 3) or using the Herschel-Bulkley's equation as described above.

In the grease composition of the second invention according to the present disclosure, it is preferable that the shear stress at the shear rate of 20,000 s$^{-1}$ at 25° C. is 0.1 Pa or less. It is more preferable that the shear stress is 0.08 Pa or less. The lower limit of the shear stress is, for example, 0.05 Pa.

The grease composition of the second invention according to the present disclosure is not especially limited as long as the grease composition contains the base oil and the thickener, and the above-described yield stress and shear stress are within the specified ranges. The base oil is not especially limited, and therefore a general base oil normally used in a field of grease may be employed. Examples of the base oil include highly refined oil, mineral oil, ester oil, ether oil, synthetic hydrocarbon oil (PAOoil), silicone oil, fluorine oil, and mixed oil of any of these oils. As described in the following example, in a case in which the base oil contains the ester oil, the bearing lifetime might be shortened or the bearing torque might be increased, and thus it is preferable to employ the base oil without the ester oil. The ester oil has an ester group in a molecule and is liquid at a room temperature. Examples of the ester oil include polyol ester oil, phosphate ester oil, polymer ester oil, aromatic ester oil, carbonate ester oil, and diester oil.

Of these oils, the base oil that contains the PAO oil as a main component is preferable. In this case, the content of the PAO oil to the whole of the base oil (mixed oil) is 50 mass % or more, preferably 80 mass % or more. In particular, the base oil that contains only the PAO oil (100% PAO oil) is preferable.

Dynamic viscosity of the base oil (in case of mixed oil, the dynamic viscosity of the mixed oil) at 40° C. is, for example, 30-100 mm$^2$/s, preferably 30-80 mm$^2$/s. Lower dynamic viscosity of the base oil is preferable from a viewpoint of realizing the low torque property, however in such a case, the bearing lifetime might be shortened. Thus, by setting the dynamic viscosity of the base oil to 30-80 mm$^2$/s, both of the low torque property and the long lifetime can be further easily realized. More preferably, the dynamic viscosity of the base oil at 40° C. is 30-50 mm$^2$ The thickener of the grease composition of the second invention according to the present disclosure is not especially limited, and therefore a general thickener normally used in a field of grease may be employed. For example, soap-based thickener such as metal soap and complex metal soap, or non-soap-based thickener such as bentone, silica gel, urea compound, and urea-urethane compound may be employed. Examples of the metal soap include sodium soap, calcium soap, aluminum soap, and lithium soap. Examples of the urea compound and urea-urethane compound include diurea compound, triurea compound, tetraurea compound, other polyurea compounds, and diurethane compound. Of these urea compounds, it is preferable to employ the diurea compound having superior high temperature resistance.

The diurea compound is obtained by causing a diisocyanate component and a monoamine component to react with each other. In particular, aliphatic alicyclic diurea compound is preferable as the diurea compound. The aliphatic alicyclic diurea compound is obtained by using aliphatic monoamine and alicyclic monoamine as the monoamine component. A compound rate (for example, mol %) each of the aliphatic monoamine and the alicyclic monoamine is not especially limited, however it is preferable that the compound rate of the aliphatic monoamine is larger than that of the alicyclic monoamine. Specifically, it is preferable that the compound rate of the aliphatic monoamine is 60 mol % or more to the whole of the monoamine.

Examples of the diisocyanate component that forms the diurea compound include phenylene diisocyanate, tolylene diisocyanate, diphenyl diisocyanate, diphenylmethane diisocyanate (MDI), octadecane diisocyanate, decane diisocyanate, and hexane diisocyanate. Examples of the aliphatic monoamine include hexyl amine, octylamine, dodecyl amine, hexadecylamine, octadecylamine, stearylamine, and oleylamine. Examples of the alicyclic monoamine include cyclohexylamine, and dicyclohexylamine, in particular, dicyclohexylamine is preferable.

Further, alicyclic diurea compound using alicyclic monoamine, aliphatic diurea compound using aliphatic monoamine, or aromatic diurea compound using aromatic monoamine (p-toluidine or the like) may be employed as the diurea compound.

The base grease is produced by compounding the thickener into the base oil. The base grease containing the diurea compound as the thickener is produced by causing the diisocyanate component and the monoamine component to react with each other in the base oil. A content of the thickener to the whole of the grease composition is, for example, 5-40 mass %, preferably 10-30 mass %, and more preferably 10-20 mass %. In a case in which the content of the thickener is less than 5mass %, a thickening effect is inferior and thus the base grease is difficult to be in a greasy condition. Further, in a case in which the content of the thickener is more than 40 mass %, the obtained base grease becomes too hard and thus a specified effect is hardly realized.

In addition, a known additive may be added as needed to the grease composition. Examples of the additive include an extreme pressure agent such as organic zinc compound and organic molybdenum compound, an antioxidant such as amine-based compound, phenol-based compound and sulfur-based compound, a friction preventive agent such as sulfur-based compound and phosphorus-based compound, an antirust agent such as polyhydric alcohol ester, a friction reduction agent such as molybdenum disulfide and graphite, and an oily agent such as ester and alcohol.

The worked penetration (JIS K 2220) of the grease composition is preferably in a range of 200-350. In a case in which the worked penetration is less than 200, a lack of lubrication might be caused because of less oil separation. In a case in which the worked penetration is more than 350, the grease composition is so soft that the grease composition is liable to undesirably leak out of the bearing.

The above-described grease composition is sealed in the rolling ball bearing of the second invention according to the present disclosure. The grease composition has low viscosity at the shear rate of 20,000 s$^{-1}$. Accordingly, the rolling ball bearing with the grease composition is suitable to a bearing used in a relatively low rotation speed range. The actual use rotation speed range of the rolling ball bearing is preferably 2,000 min- or less, and more preferably 1,600 min- or less.

Further, as described in the following example, the rolling ball bearing of the second invention according to the present disclosure shows a low torque property under a high load condition and a low rotation speed condition and has superior high temperature resistance. Accordingly, the rolling ball bearing is suitable to a rolling ball bearing used under a condition of high load, low speed and high temperature.

For example, the rolling ball bearing can be employed as a bearing of a low speed motor used in a high temperature environment, a segment roll bearing for continuous casting equipment, or the like.

As the rolling ball bearing of the second invention according to the present disclosure, the deep groove ball bearing is exemplarily described with reference to FIG. 4, however the rolling ball bearing is not limited thereto. For example, the rolling ball bearing can be applied to an angular ball bearing, or a vehicle hub bearing that uses a ball as a rolling element. The industrial field of the rolling ball bearing of the second invention according to the present disclosure is extremely wide, and thus the rolling ball bearing can be applied to various apparatuses.

EXAMPLE

Example A1 and Comparative examples A1 to A3

The grease compositions were obtained by compounding the base oil and the thickener at the compound rate (mass %) shown in Table 1. The grease viscosity, the shear stress and the yield stress of each of the obtained grease compositions were calculated.

(1) Grease Viscosity and Shear Stress

By using a cone plate type (diameter of 20 mm, cone angle of 1 degree) rheometer, the shear rate of each of the grease compositions is increased from $1\ s^{-1}$ to $8{,}000\ s^{-1}$ at the temperature of 25° C. and the frequency of 1 Hz. The shear stress in a steady flow at each shear rate is measured and then the grease viscosity at each shear rate is calculated from the above-described Herschel-Bulkley's equation. Based on the calculated grease viscosity, the grease viscosity is extrapolated up to the viscosity at the shear rate of $10{,}000\ s^{-1}$. Further, each of the shear stresses is calculated by multiplying the calculated grease viscosity and each of the shear rate. The maximum values of each of the calculated grease viscosities and the measured shear stresses are shown in Table 1. In Table 1, the maximum grease viscosity corresponds to the grease viscosity at the shear rate of $1{,}000\ s^{-1}$, and the maximum shear stress corresponds to the shear stress at the shear rate of $10{,}000\ s^{-1}$.

(2) Yield Stress

By using a parallel plate type rheometer having an upper plate and a lower plate (gap of 0.5 mm), the dynamic viscoelasticity analysis according to the following conditions is executed on each of the grease compositions. Specifically, the grease composition is disposed to be interposed between the upper plate and the lower plate and then cyclic shear stress caused by vibration is applied to the grease composition. Based on the response thereof, the storage modulus G' and the loss modulus G" are measured. The shear stress when the measured storage modulus G' and the loss modulus G" matches with each other is defined as the yield stress. The results thereof are shown in Table 1.

Shear stress: increased from 10 Pa to 4,000 Pa

Measurement frequency: 1 Hz

Measurement temperature: 25° C.

Each plate: diameter of 25 mm (3) Hub bearing lifetime test

The obtained each grease composition is sealed in each hub bearing of PCD 58 mm (see FIG. 1) to produce the hub bearing for the lifetime test. The obtained each hub bearing is rotated at the rotation speed of 300 $min^{-1}$ (approximately 3,000 $s^{-1}$) under a condition of non-controlled temperature and swing load of 0.6 G, and then the time (h) until the flaking is caused and thus the hub bearing is incapable of being used, is measured. Table 1 shows the lifetime ratio in each test as the lifetime of Comparative example A2 is defined as 1.

(4) Hub Bearing Torque Test

The obtained each grease composition is sealed in each hub bearing of PCD 58 mm (see FIG. 1) to produce the hub bearing for the torque test. The obtained each hub bearing is rotated at the rotation speed of 600 $min^{-1}$ (approximately 6,000 $s^{-1}$) under a condition of non-controlled temperature, axial load of 3.2 kN, and no radial load. In the torque test, the hub bearing is rotated for 180 minutes, and the torque (mNm) is defined by an average of torque during the last 3 minutes. Table 1 shows the torque ratio in each test as the torque of Comparative example A2 is defined as 1.

TABLE 1

|  | Example A1 | Comparative example A1 | Comparative example A2 | Comparative example A3 |
|---|---|---|---|---|
| Base oil (mass %) | | | | |
| Synthetic hydrocarbon oil [1] | 88 | 44 | — | 44 |
| Ester oil [2] | — | — | — | 44 |
| Mineral oil [3] | — | 44 | 88 | — |
| Thickener (mass %) | | | | |
| Amine: cyclohexylamine | — | 1.2 | — | 1.2 |
| Amine: dicyclohexylamine | 5 | — | 5 | — |
| Amine: octylamine | 1.8 | 4.7 | 1.8 | 4.7 |
| Diisocyanate: MDI | 5.2 | 6.1 | 5.2 | 6.1 |
| Evaluation | | | | |
| Maximum grease viscosity (1,000-10,000 $s^{-1}$) (Pas) | 0.4 | 1.5 | 1.6 | 1.3 |
| Maximum shear stress (1,000-10,000 s-1) (Pa) | 1,300 | 3,600 | 5,500 | 3,300 |
| Yield stress (Pa) | 1,800 | 3,900 | 1,130 | 1,250 |
| Hub bearing lifetime | 3.4 | 1.4 | 1 | — |
| Hub bearing torque | 0.45 | 0.75 | 1 | 0.55 |

1) Shinfluid 601 produced by NIPPON STEEL Chemical & Material Co., Ltd., dynamic viscosity of 31 mm²/s at 40° C.
2) Kaolube 262 produced by Kao Corporation, dynamic viscosity of 33 mm²/s at 40° C.
3) Paraffinic mineral oil, dynamic viscosity of 100 mm²/s at 40° C.

As shown in Table 1, Example A1 of which the shear stress at the shear rate of 1,000-10,000 s$^{-1}$ is 3,000 Pa or less, the viscosity is 1 Pas or less, and the yield stress is 1,300-3,000 Pa shows a low torque property and a long lifetime greater than those of Comparative examples A1 to A3.

Accordingly, in the axle bearing of the first invention according to the present disclosure, the grease composition sealed in the bearing shows low viscosity in a low rotation speed range and high yield stress, so that the shear resistance of the grease between the rolling element and the surface of the cage pocket is reduced. Consequently, the axle bearing can realize a low torque property and a long lifetime.

Example B1 and Comparative Examples B1 to B5

The grease compositions were obtained by compounding the base oil and the thickener at the compound rate (mass %) shown in Table 2. The shear stress and the yield stress of each of the obtained grease compositions were calculated.

(1) Shear stress
By using a cone plate type (diameter of 20 mm, cone angle of 1 degree) rheometer, the shear rate of each of the grease compositions is increased from 1 s$^{-1}$ to 8,000 s$^{-1}$ at the temperature of 25° C. and the frequency of 1 Hz. The shear stress in a steady flow at each shear rate is measured and then the grease viscosity at each shear rate is calculated from the above-described Herschel-Bulkley's equation. Based on the calculated grease viscosity, the grease viscosity is extrapolated up to the viscosity at the shear rate of 20,000 s$^{-1}$. Further, each of the shear stresses at the shear rate of 20,000 s is calculated by multiplying the calculated grease viscosity and the shear rate of 20,000 s$^{-1}$. The results thereof are shown in Table 2.

(2) Yield Stress
By using a parallel plate type rheometer having an upper plate and a lower plate (gap of 1 mm), the dynamic viscoelasticity analysis according to the following conditions is executed on each of the grease compositions. Specifically, the grease composition is disposed to be interposed between the upper plate and the lower plate and then cyclic shear stress caused by vibration is applied to the grease composition. Based on the response thereof, the storage modulus G' and the loss modulus G" are measured. The shear stress when the measured storage modulus G' and the loss modulus G" matches with each other is defined as the yield stress. The results thereof are shown in Table 2.

Shear stress: increased from 10 Pa to 3,000 Pa
Measurement frequency: 1 Hz
Measurement temperature: 25° C.
Each plate: diameter of 25 mm (3) High Temperature Grease Lifetime Test
The obtained each grease composition is sealed in each deep groove ball bearing (TS3-6204ZZC3 produced by NTN Corporation) to produce the bearing for the high temperature grease lifetime test. The obtained each bearing is rotated at the rotation speed of 10,000 min$^{-1}$ under a condition of temperature of 150° C., axial load of 67 N and radial load of 67 N, and then the time until seizure of the bearing is caused is measured. The grease lifetime of 3,000 hours or more is determined to be acceptable. The results thereof are shown in Table 2.

(4) Bearing Torque Test
The obtained each grease composition is sealed in each deep groove ball bearing (6204T2LLBC3 produced by NTN Corporation) to produce the bearing for the bearing torque test. The obtained each bearing is rotated at the rotation speed of 1,600 min$^{-1}$ under a condition of non-controlled temperature, axial load of 8 kgf and radial load of 0 kgf. In the test, the bearing is rotated for 30 minutes, and the torque (mNm) is defined by an average of torque during the last 10 minutes. The torque of 30 or less is determined to be acceptable. The results thereof are shown in Table 2.

TABLE 2

|  | Example B1 | Comparative example B1 | Comparative example B2 | Comparative example B3 | Comparative example B4 | Comparative example B5 |
|---|---|---|---|---|---|---|
| Base oil (mass %) | | | | | | |
| Synthetic hydrocarbon oil [1] | 88 | 22 | — | — | 30 | — |
| Ester oil [2] | — | 22 | 68 | — | 58 | 88 |
| Ester oil [3] | — | 44 | 21 | — | — | — |
| Mineral oil [4] | — | — | — | 88 | — | — |
| Thickener (mass %) | | | | | | |
| Diurea compound | | | | | | |
| Amine: p-toluidine | — | 1.3 | — | — | — | — |
| Amine: cyclohexylamine | — | — | — | — | 1.2 | 5.3 |
| Amine: dicyclohexylamine | 5 | — | — | 5 | — | — |
| Amine: octylamine | 1.8 | 4.7 | — | 1.8 | 4.7 | — |
| Diisocyanate: MDI | 5.2 | 6 | — | 5.2 | 6.1 | 6.7 |
| Lithium 12-hydroxystearate | — | — | 11 | — | — | — |
| Evaluation | | | | | | |
| Shear stress (20,000 s$^{-1}$) (Pa) | 0.08 | 0.089 | 0.106 | 0.579 | 0.264 | 0.212 |

TABLE 2-continued

|  | Example B1 | Comparative example B1 | Comparative example B2 | Comparative example B3 | Comparative example B4 | Comparative example B5 |
|---|---|---|---|---|---|---|
| Yield stress (Pa) | 1,800 | 1,757 | 1,759 | 1,556 | 1,241 | 588 |
| Grease lifetime test (150° C.) (hour) | >3,000 | 790 | 580 | 2,200 | 2,576 | 818 |
| Torque test (1,600 min$^{-1}$) (mNm) | 27.9 | 18 | 27.3 | 59.1 | 34.6 | 33.3 |

[1] Shinfluid 601 produced by NIPPON STEEL Chemical & Material Co., Ltd., dynamic viscosity of 31 mm$^2$/s at 40° C.
[2] Kaolube 262 produced by Kao Corporation, dynamic viscosity of 33 mm$^2$/s at 40° C.
[3] Dioctyl sebacate (DOS), dynamic viscosity of 12 mm$^2$/s at 40° C.
[4] Paraffinic mineral oil, dynamic viscosity of 100 mm$^2$/s at 40° C.

1) Shinfluid 601 produced by NIPPON STEEL Chemical & Material Co., Ltd., dynamic viscosity of 31 mm$^2$/s at 40° C.
2) Kaolube 262 produced by Kao Corporation, dynamic viscosity of 33 mm$^2$/s at 40° C.
3) Dioctyl sebacate (DOS), dynamic viscosity of 12 m$^2$/s at 40° C.
4) Paraffinic mineral oil, dynamic viscosity of 100 m$^2$/s at 40° C.

As shown in Table 2, the grease composition (Example B1) of which the shear stress at the shear rate of 20,000 s$^{-1}$ is 0.2 Pa or less and the yield stress is 1,600 Pa or more shows a low torque property and a long lifetime, and thus the grease composition is acceptable in every tests. On the other hand, Comparative examples B1 and B2 are not so different from Example B1 in physical properties (the shear stress and the yield stress), however each of Comparative examples B1 and B2 shows a short lifetime in the high temperature grease lifetime test. Further, Comparative examples B4 and B5 are equivalent to Example B1 in the dynamic viscosity of the base oil, however each of Comparative examples B4 and B5 shows low yield stress of the grease composition and relatively high torque in the torque test.

The grease composition of the second invention according to the present disclosure shows low viscosity in a specified shear rate range and shows high yield stress, and thus the shear resistance of the grease between the ball and the surface of the cage pocket is reduced. Consequently, the grease composition can contribute a low torque property and a long lifetime.

INDUSTRIAL APPLICABILITY

The axle bearing of the present invention has a low torque property and superior lifetime, and thus the axle bearing can be widely used as an axle bearing, in particular, the axle bearing is suitable to a hub bearing for vehicles used under a high load condition and a low rotation condition. Further, the grease composition of the present invention contributes a low torque property and superior lifetime, and thus the industrial field of the grease composition is extremely wide. Accordingly, the grease composition can be applied to various apparatuses. In particular, the grease composition is suitable to a rolling ball bearing used under a high load condition and a high temperature condition.

REFERENCE SIGNS LIST

1: hub wheel
1a: inner raceway surface
1b: small diametrical stepped portion
1c: swaging portion
1d: wheel mount flange
2: inner ring
2a: inner raceway surface
3: outer member
3a: outer raceway surface
3b: vehicle body mount flange
4: rolling element
5: inner member
6: hub bearing
7: seal member
8: seal member
9: cage
10: grease composition
11: rheometer
12: cone plate type cell
13: horizontal disc plate
14: grease
21: deep groove ball bearing
22: inner ring
23: outer ring
24: ball
25: cage
26: seal member
27: grease composition
28: retaining claw
29: pocket
30: flat portion

The invention claimed is:

1. An axle bearing that is configured to rotatably support a wheel of a vehicle or an axle connected to the wheel, the axle bearing comprising a grease composition sealed in an inner space of the axle bearing,
wherein:
the grease composition contains a base oil and a thickener,
the shear stress of the grease composition at the shear rate of 1,000-10,000 s$^{-1}$ at 25° C. is 3,000 Pa or less, the viscosity of the grease composition is 1 Pas or less, and
the yield stress of the grease composition at 25° C. measured by a dynamic viscoelasticity analysis method using a rheometer is 1,300-3,000 Pa.

2. The axle bearing as defined in claim 1, wherein:
the thickener is a diurea compound obtained by causing a diisocyanate component and a monoamine component to react with each other, and
the monoamine component includes aliphatic monoamine and alicyclic monoamine.

3. The axle bearing as defined in claim 2, wherein the alicyclic monoamine contains dicyclohexylamine.

4. The axle bearing as defined in claim 1, wherein:
the base oil contains synthetic hydrocarbon oil as a main component, and the dynamic viscosity of the base oil at 40° C. is 30-80 mm²/s.

5. The axle bearing as defined in claim 1, the axle bearing being configured as a hub bearing that rotatably supports a wheel of a vehicle, wherein:

the hub bearing comprising: an outer member having double-row outer raceway surfaces on an inner periphery; an inner member having double-row inner raceway surfaces on an outer periphery, the double-row inner raceway surfaces respectively facing the double-row outer raceway surfaces; double-row rolling elements housed between the inner raceway surfaces and the outer raceway surfaces; and the grease composition sealed around the rolling elements, the inner member comprises a hub wheel and an inner ring, the hub wheel has: a wheel mount flange integrally formed on one end portion of the hub wheel; one of the inner raceway surfaces that faces one of the double-row outer raceway surfaces and that is formed on an outer periphery of the hub wheel; and a small diametrical stepped portion that extends from the inner raceway surface in an axial direction, the inner ring has the other one of the inner raceway surfaces that faces the other one of the double-row outer raceway surfaces and that is formed on an outer periphery of the inner ring, and the inner ring is press-fitted onto the small diametrical stepped portion of the hub wheel and is fixed to the hub wheel using a swaging portion that is formed by plastically deforming an end portion of the small diametrical stepped portion toward a radially outer side.

6. The axle bearing as defined in claim 5, the axle bearing being configured to be used in a rotation speed range of 1,000 min$^{-1}$ or less.

7. A grease composition comprising a base oil and a thickener, wherein:

the shear stress of the grease composition at the shear rate of 20,000 s$^{-1}$ at 25° C. is 0.2 Pa or less, and the yield stress of the grease composition at 25° C. measured by a dynamic viscoelasticity analysis method using a rheometer is 1,600 Pa or more.

8. The grease composition as defined in claim 7, wherein:

the thickener is a diurea compound obtained by causing a diisocyanate component and a monoamine component to react with each other, and the monoamine component includes aliphatic monoamine and alicyclic monoamine.

9. The grease composition as defined in claim 8, wherein the alicyclic monoamine contains dicyclohexylamine.

10. The grease composition as defined in claim 7, wherein:

the base oil contains synthetic hydrocarbon oil as a main component, and the dynamic viscosity of the base oil at 40° C. is 30-80 mm²/s.

11. A rolling ball bearing comprising:

an inner ring;

an outer ring;

a ball interposed between the inner ring and the outer ring;

a resin cage that retains the ball; and a grease composition sealed around the ball, the grease composition being defined in claim 7.

12. The rolling ball bearing as defined in claim 11, the rolling ball bearing being configured to be used in a rotation speed range of 2,000 min$^{-1}$ or less.

* * * * *